(12) United States Patent
Sinelli et al.

(10) Patent No.: US 7,594,731 B2
(45) Date of Patent: Sep. 29, 2009

(54) SIDE MIRROR ASSEMBLY FOR A MOTOR VEHICLE

(75) Inventors: Gary J. Sinelli, Royal Oak, MI (US); Paul R. Henion, Port Huron, MI (US)

(73) Assignee: Visiocorp Patents S.a.r.l., Stuttgart (DE)

( * ) Notice: Subject to any disclaimer, the term of this patent is extended or adjusted under 35 U.S.C. 154(b) by 279 days.

(21) Appl. No.: 11/763,601

(22) Filed: Jun. 15, 2007

(65) Prior Publication Data

US 2008/0310041 A1 Dec. 18, 2008

(51) Int. Cl.
G02B 5/08 (2006.01)
G02B 7/182 (2006.01)
B60R 1/06 (2006.01)

(52) U.S. Cl. ........................ 359/841; 359/872; 359/875; 359/882; 248/479

(58) Field of Classification Search ................. 359/841, 359/872, 875, 882; 248/478, 479
See application file for complete search history.

(56) References Cited

U.S. PATENT DOCUMENTS

| | | | | | |
|---|---|---|---|---|---|
| 2,526,306 | A | * | 10/1950 | Gelder | 248/279.1 |
| 2,573,443 | A | * | 10/1951 | Holland | 248/480 |
| 3,671,005 | A | * | 6/1972 | Schultz | 248/480 |
| 3,977,774 | A | * | 8/1976 | O'Sullivan | 359/851 |
| 4,558,930 | A | * | 12/1985 | Deedreek | 359/841 |
| 5,039,055 | A | | 8/1991 | Lempelius | |
| 5,482,310 | A | * | 1/1996 | Staggs | 280/477 |
| 5,483,385 | A | * | 1/1996 | Boddy | 359/841 |
| 5,831,779 | A | * | 11/1998 | Moore | 359/841 |
| 6,592,231 | B2 | * | 7/2003 | Home et al. | 359/841 |
| 6,877,868 | B2 | * | 4/2005 | Olijnyk et al. | 359/841 |
| 7,021,779 | B1 | * | 4/2006 | Goosens | 359/862 |
| 7,165,853 | B2 | * | 1/2007 | Gilbert et al. | 359/841 |
| 7,287,867 | B2 | * | 10/2007 | Wellington et al. | 359/841 |

* cited by examiner

Primary Examiner—Ricky D Shafer
(74) Attorney, Agent, or Firm—Reising Ethington P.C.

(57) ABSTRACT

A side mirror assembly for a motor vehicle includes a base which is fixedly secured to the motor vehicle. A tube is pivotably secured to the base. The tube extends between a pivot end and a distal end. A mirror housing defines a mirror opening and a tube opening. The mirror housing receives the distal end and a portion of the tube disposed adjacent the distal end through the tube opening. A mirror is mounted within the mirror housing and is exposed through the mirror opening for an operator of the motor vehicle to view rearward of the motor vehicle without turning completely around. A case frame is fixedly secured to the mirror housing at a position disposed adjacent the mirror. The side mirror assembly also includes a locking lever which is movable between an unlocked position allowing the case frame and the mirror housing to slide along the tube and a lock position for securing the case frame and the mirror housing at a desired position along the tube.

27 Claims, 4 Drawing Sheets

SIDE MIRROR ASSEMBLY FOR A MOTOR VEHICLE

BACKGROUND ART

1. Field of the Invention

The invention relates to mirror assemblies for motor vehicles. More particularly, the invention relates to telescoping side mirrors for motor vehicles.

2. Description of the Related Art

Motor vehicles are equipped with side mirrors to facilitate the operator of the motor vehicles to view spaces and objects behind the motor vehicle. As the motor vehicles get bigger, with the popularity of sport utility vehicles, and the loads in which the motor vehicles can haul increase, the ability for the operator of the motor vehicle to view the spaces therebehind becomes increasingly difficult. Therefore, there is a need in the art to develop a side mirror that may accommodate the operator's ability to view the spaces therebehind a large motor vehicle or a motor vehicle that is hauling a trailer therebehind.

U.S. Pat. No. 5,039,055, issued to Lempelius on Aug. 13, 1991, discloses an adjustable mirror assembly that allows the side mirror to be moved out and away from the motor vehicle to allow the operator to see greater spaces beyond the motor vehicle than would otherwise be seen with a traditional side mirror assembly. The mirror assembly includes a mirror housing or case that allows a portion of the tube to be stored therein. A set screw is housed within a grommet that is fixedly secured to the case. The set screw is threadingly engaged with the grommet. When the set screw is unscrewed, the case, and the mirror secured thereto, are moved along the tube until the case and mirror reach the desired location. Once in the desired location, the set screw is tightened on the tube and the case and mirror are secured in a position extending away from the motor vehicle to which the mirror assembly is attached. When such a distance is no longer required, the set screw may be loosened and the case and housing may be retracted to a position closer to the motor vehicle. This assembly is less desirable because it requires a tool to loosen die set screw and tighten the set screw. The operator of the motor vehicle may be found in a situation where he would desire the mirror and case to be extended to a position further away from the motor vehicle, but lacks the proper tool to facilitate the position change.

SUMMARY Of THE INVENTION

A side mirror assembly for a motor vehicle includes a base which is fixedly secured to the motor vehicle. A tube is pivotally secured to the base. The tube extends between a pivot end and a distal end. A mirror housing defines a mirror opening and a tube opening. The mirror housing receives the distal end and a portion of the tube disposed adjacent the distal end through the tube opening. A mirror is mounted within the mirror housing and is exposed through the mirror opening for an operator of the motor vehicle to view rearward of the motor vehicle without turning completely around. A case frame is fixedly secured to the mirror housing at a position disposed adjacent the mirror. The side mirror assembly also includes a locking lever which is movable between an unlocked position allowing the case frame and the mirror housing to slide along the tube and a lock position for securing the case frame and die mirror housing at a desired position along the tube.

BRIEF DESCRIPTION OF THE DRAWINGS

Advantages of the invention will be readily appreciated as the same becomes better understood by reference to die following detailed description when considered in connection with the accompanying drawings, wherein.

DETAILED DESCRIPTION OF THE PREFERRED EMBODIMENT

Figure 1:
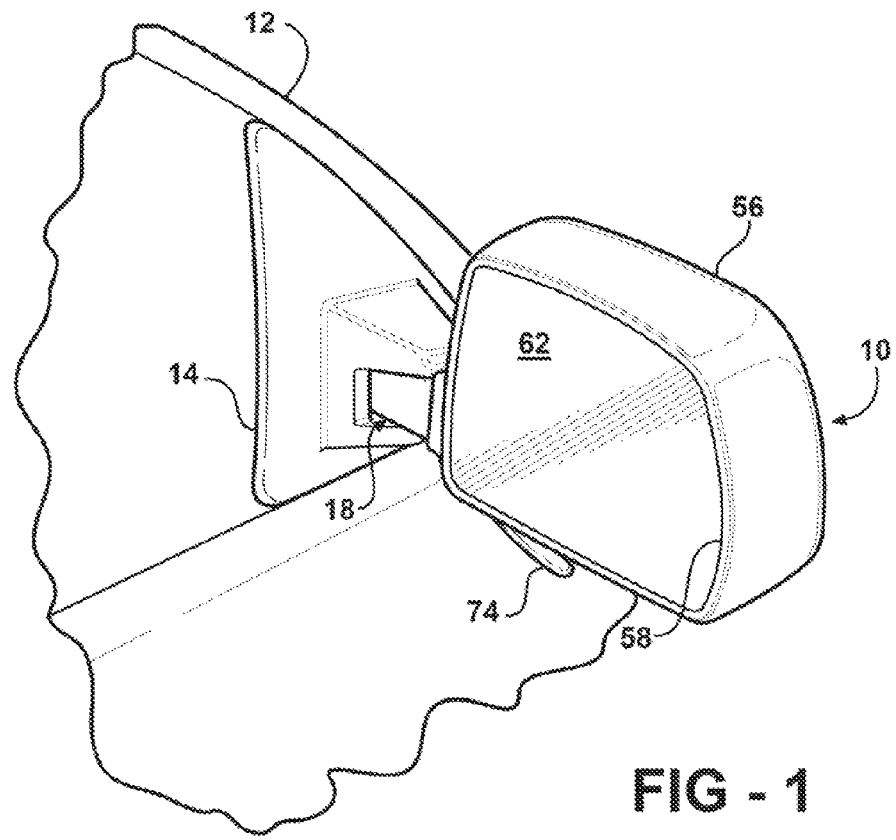
FIG. 1 is a perspective view of one embodiment of the invention secured to a motor vehicle, shown partially cut away, wherein the side mirror is in a retracted position.

Referring to FIG. 1, one embodiment of the preferred embodiment is generally indicated at 10. The preferred embodiment is a side mirror assembly 10. The side mirror 10 is fixedly secured to a motor vehicle 12. While the side mirror assembly 10 is shown as a side mirror assembly fixedly secured to a passenger side of a motor vehicle 12, it should be appreciated by those skilled in the art that the side mirror assembly 10 may also be used on the drivers side of the motor vehicle 12.

Figure 3:
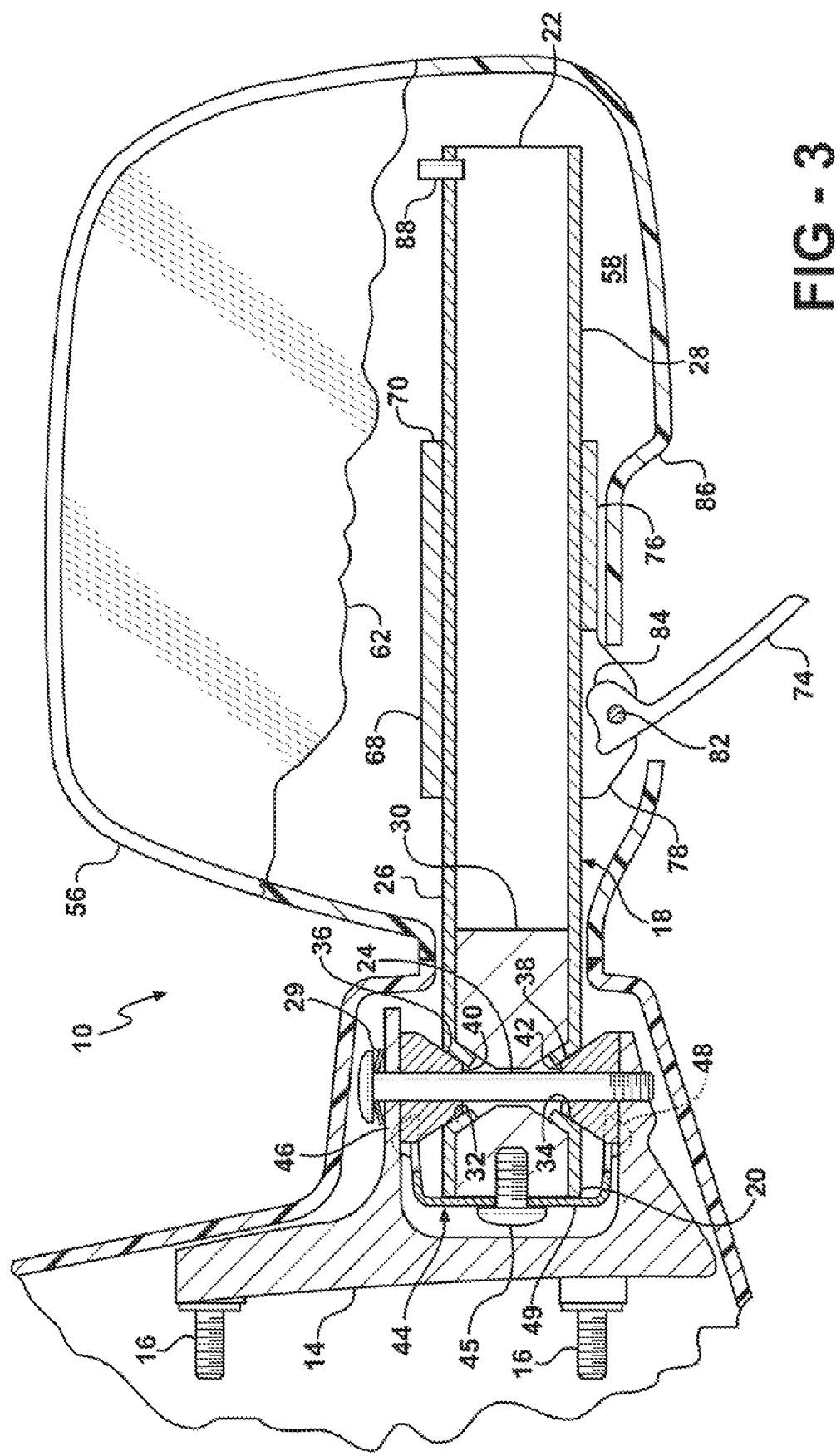
FIG. 3 is a partial cross-sectional side view of the invention in the retracted position.
Figure 4:
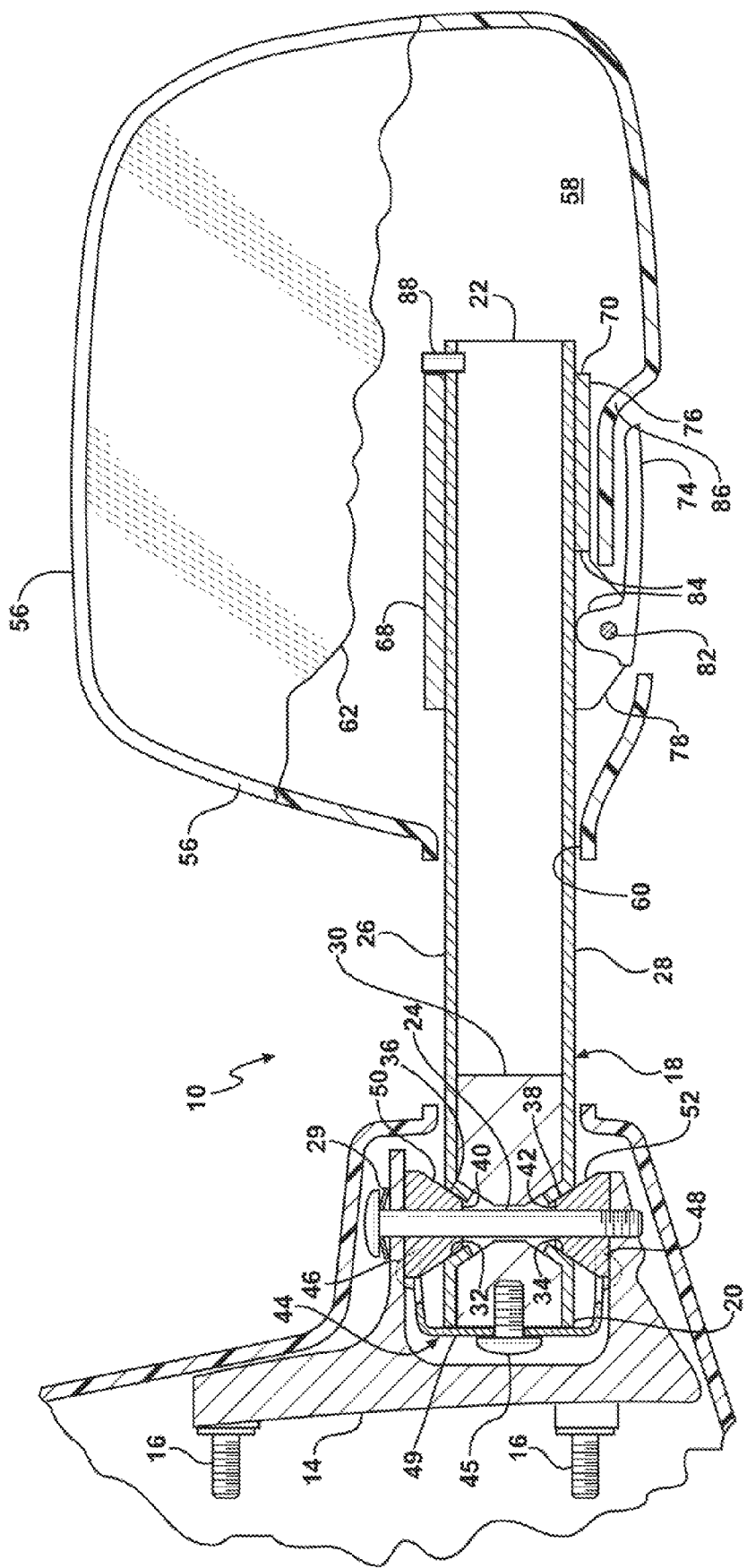
FIG. 4 is a partial cross-sectional side view of the invention in the extended position.

The side mirror assembly 10 includes a base 14 which is fixedly secured to the motor vehicle 12. Referring to FIGS. 3 and 4, the base 14 is secured to the motor vehicle 12 with a plurality of bolts 16.

The side mirror assembly 10 also includes a tube, generally shown at 18, that is pivotally secured to the base 14. The tube 18 extends between a pivot end 20 and a distal end 22. In the embodiment shown, the tube 18 has a square cross-section. It should be appreciated by those skilled in the art that the cross-section of the tube 18 may vary from a square cross-section and may even include a non-closed cross-section.

The pivot end 20 of the tube 18 is secured to the base 14 using a pivot bolt 24. The pivot bolt 24 extends through two sides of the tube 18. In the embodiment shown, the pivot bolt 24 extends through an upper tube side 26 mid a lower tube side 28. The pivot bolt 24 allows the tube 18 to pivot through a plane that is generally parallel with ground (not shown). A Belleville washer 29 applies a force between a head of the pivot bolt 24 and the tube 18.

Figure 6:
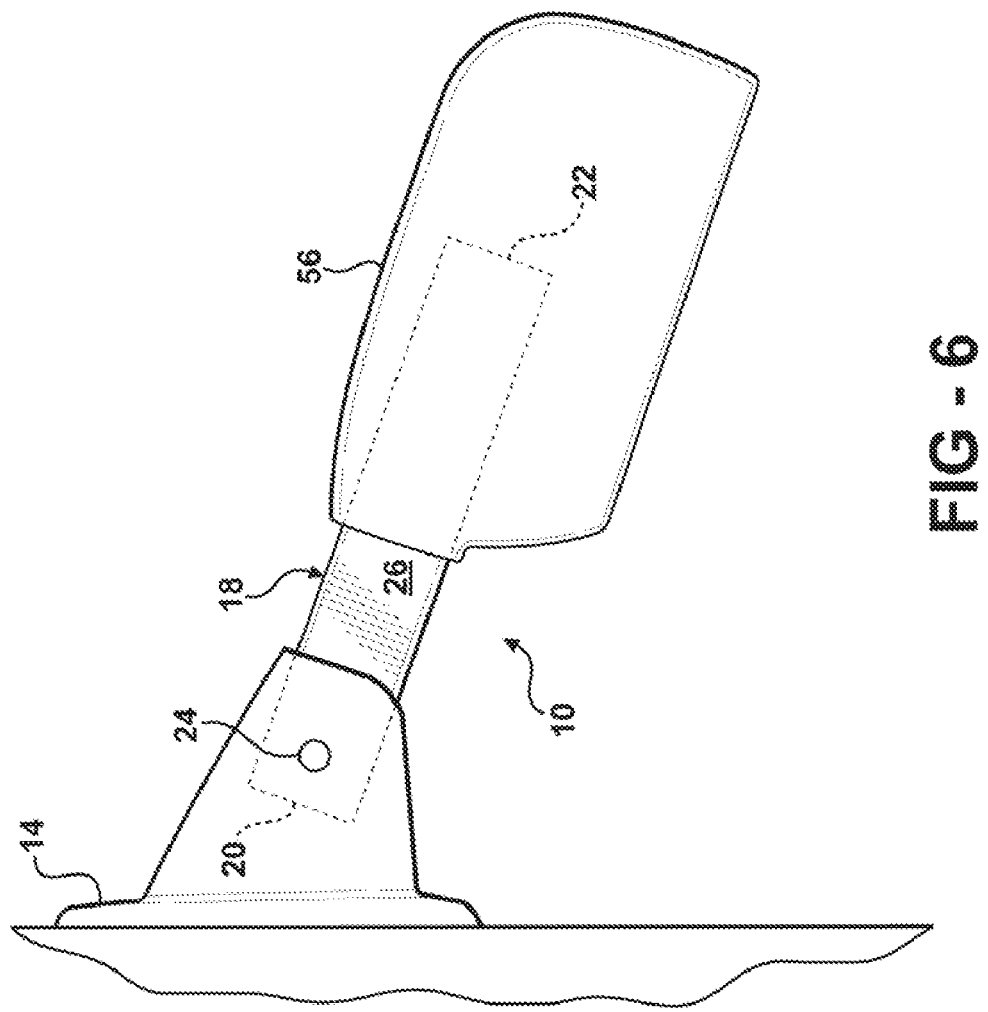
FIG. 6 is a top view of the invention in an unfolded, extended position.
Figure 5:
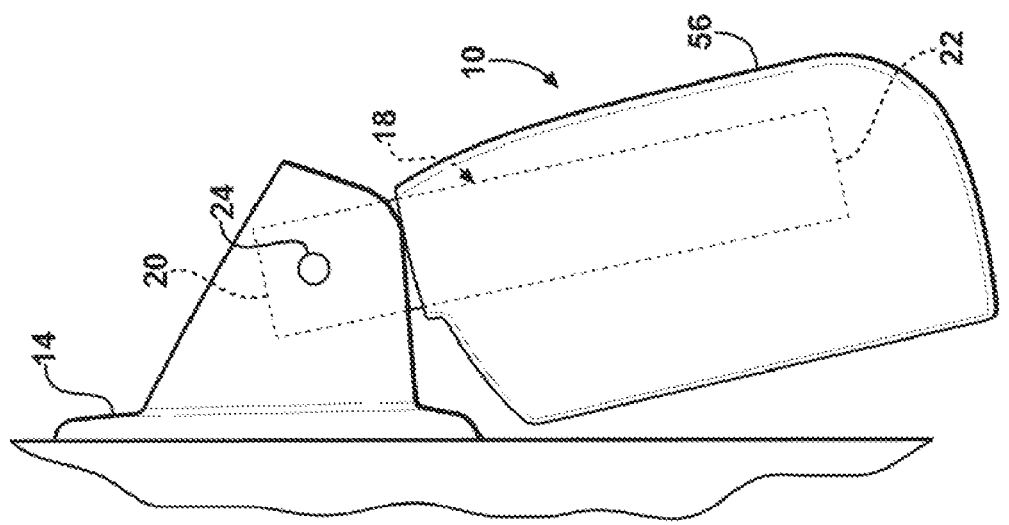
FIG. 5 is a top view of the invention in a folded position.

The pivot end 20 also includes a pivot plug 30 which extends through the interior portion of the pivot end 20 of the tube 18. The pivot plug 30 is inserted into the tube 18 prior to the finishing of the tube 18. Once the pivot plug 30 is in place inside the tube 18, the tube 18 is swaged resulting in the creation of at least one frustoconical portion 32. In the embodiment shown in the Figures, there are two frustoconical portions 32, 34 having angled side surfaces 36, 38 and a flat end surface 40, 42, respectively. The pivot bolt 24 extends through two holes in the base 14, each within one of the end surfaces 40, 42 of the frustoconical portions 32, 34. The pivot plug 30 receives a detent spring 44 which provides a retention force against the tube 18 preventing the tube from pivoting unless a force is applied to the distal end 22 of the tube 18 with sufficient force to overcome the force created by the detent spring 44. The detent spring is secured to the pivot plug 30 with a bolt 45. Forces great enough to overcome the detent spring 44 includes forces created by an individual trying to rotate the tube 18 toward and away from the motor vehicle 12 (FIGS. 5 and 6, respectively) and situations where an accident may be occurring forcing the tube 18 to move with respect to the base 14. The detent spring 44 includes a primary portion 49 that extends around the pivot end 20 of the tube 18. The detent spring 44 has two ends 46, 48 which extend the pivot bolt 24. Friction cones 50, 52 extend into the frustoconical portions 32, 34. The friction cones 50, 52 are fabricated from a plastic material.

The side mirror assembly 10 also includes a mirror housing 56. The mirror housing 56 defines a mirror opening 58 and a tube opening 60. The mirror housing 56 receives the distal end 22 and a portion of the tube 18 disposed adjacent the distal end 22 through the tube opening 60. A mirror 62 is mounted with the mirror housing 56. The mirror 62 is exposed through the mirror opening 58 for an operator of the motor vehicle 12 to view rearward of the motor vehicle 12 without turning completely around. More specifically, die mirror 62 allows the operator of the motor vehicle 12 to quickly see objects in space behind the motor vehicle 12 without have to turn completely around to remove one's vision from the direction in which the motor vehicle 12 is traveling.

The mirror 62 is mounted within the mirror housing 56 using a mirror mount (not shown) that includes a plate support to which the mirror 62 is directly secured. The plate support is pivotal to facilitate directing the minor 62 to the proper orientation to allow the operator the best possible view rearview of the motor vehicle 12.

The side mirror assembly 10 also includes a case frame 68, which is fixedly secured to the mirror housing 56 at a position disposed adjacent the mirror 62. More specifically, the case frame 68 is mounted to die mirror housing 56 at a position below and behind die mirror 62 to facilitate the freedom of pivotal rotation for the mirror 62. The case frame 68 is designed to extend around the tube 18. In particular, the case frame 68 receives the tube 18 therein allowing the mirror housing 56 to be mounted to the tube 18. The case frame 68 has a defined length which is less than the length mirror housing 56. The case frame 68 has a periphery that is generally identical to the tube periphery 18. More specifically, the outer periphery of the tube 18 is substantially similar to and slightly less than fee inner periphery of the case frame 68.

The case frame 68 includes an outer end 70. The outer end 70 defines a stop edge, discussed in greater detail subsequently.

Figure 2:
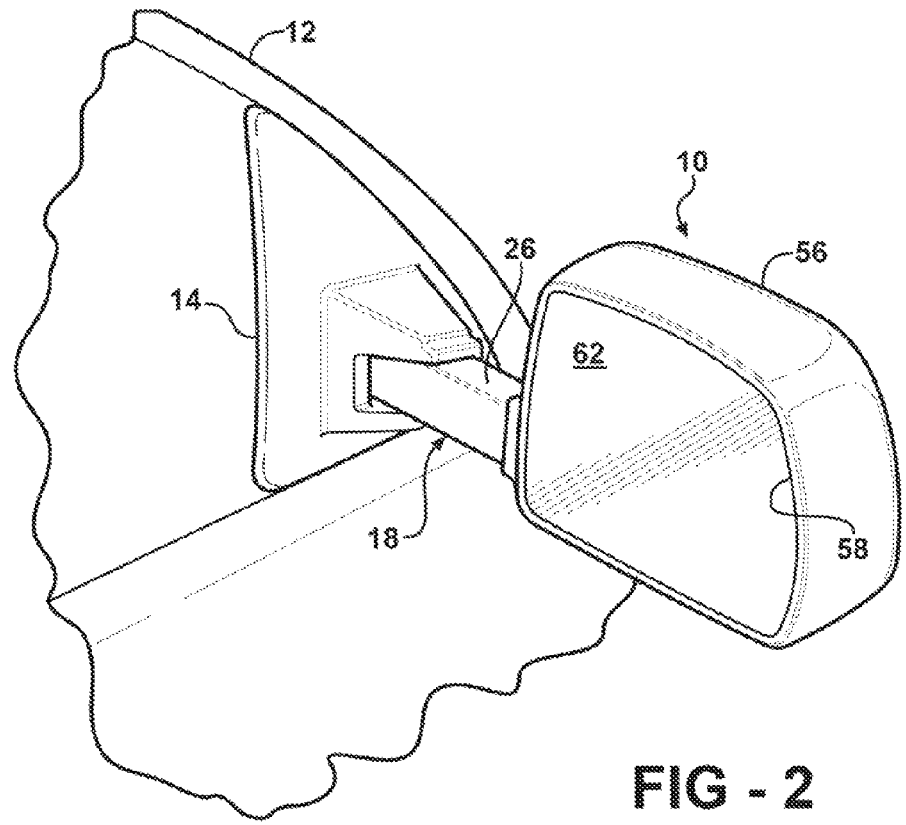
FIG. 2 is a perspective view of the invention secured to the motor vehicle, shown partially cut away, wherein the side mirror is in an extended position.

The side mirror assembly 10 also includes a locking lever 74, which is movable between an unlock position (FIGS. 1 and 3) allowing the case frame 68 and the mirror housing 56 to slide along the tube 18 and a lock position (FIGS. 2 and 4) for securing the case frame 68 and the mirror housing 56 at a desired position along the tube 18. The locking lever 74 is pivotably secured to the case frame 68. In the embodiment shown in the Figures, the locking lever 74 is secured to a bottom surface 76 of the case frame 68. The bottom surface 76 includes two flanges 78 (one shown) which extend downwardly from tire bottom surface 76 of the case frame 68. A lever pin 82 pivotally secures the locking lever 74 to the two flanges 78 and allows the locking lever 74 to pivot with respect thereto.

The locking lever 74 includes a cam locking surface 84 located at a position disposed adjacent the position at which the locking pin 82 extends through the locking lever 74. The cam locking surface 84 engages the tube 18 to prevent the case frame 68 and the mirror housing 56 from moving along the tube 18. The cam locking surface 84 frictionally engages the tube 18 and prevents the case frame 68 from moving therealong. In the embodiment shown, the locking lever 74 is in a unlock position when the locking lever 74 is pivoted away from the mirror housing 56. In the lock position, the locking lever 74 is stored within a lever recess 86 which is a recess in the mirror housing 56. The lever recess 86 allows the locking lever 74 to be in the lock position and out of view during normal operation of die motor vehicle 12. In addition, the locking recess 86 allows the side mirror assembly 10 to have a more aerodynamic profile by allowing the locking lever 74 to move into a locking position which abuts the mirror housing 56 in a flush manner.

In operation, the locking lever 74 is moved from its locking position to its unlocking position. Once in the unlocked position, die mirror housing 56 may he moved axially along the tube 18 in a manner which replicates a telescoping motion. Depending on the initial position of the mirror housing 56, the mirror housing may move from a retracted position, shown in FIG. 3, to an extended position, shown in FIG. 4. A stop 88 is secured to the tube 18 at the distal end 22 thereof. The stop edge 70 in the case frame 68 receives the stop 88 thereagainst and prevents the mirror housing 56 from being removed from the tube 18 by preventing the mirror housing 56 from moving all the way past the distal end 22 of the tube 18.

Once the mirror housing is in the desired location, the locking lever 74 is returned to its locking position preventing the mirror housing 56 from moving axially along the tube 18 in any direction.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed:

1. A side mirror assembly for a motor vehicle, said side mirror assembly comprising:
   a base fixedly secured to the motor vehicle;
   a tube pivotally secured to said base, said tube extending between a pivot end and a distal end;
   a mirror housing defining a mirror opening and a tube opening, said mirror housing receiving said distal end and a portion of said tube disposed adjacent said distal end through said tube opening;
   a mirror mounted within said mirror housing and exposed through said mirror opening for an operator of the motor vehicle to view rearward of the motor vehicle without turning completely around;
   a case frame fixedly secured to said mirror housing at a position disposed adjacent said mirror; and
   a locking lever movable between an unlock position allowing said case frame and mirror housing to slide along said tube and a lock position for securing said case frame and said mirror housing at a desired position along said tube.

2. A side mirror assembly as set forth in claim 1 wherein said locking lever includes a cam locking surface for engaging said tube to prevent said case frame and said mirror housing from moving along said tube.

3. A side mirror assembly as set forth in claim 2 wherein said locking lever is pivotally secured to said case frame.

4. A side mirror assembly as set forth in claim 3 including a stop fixedly secured to said distal end of said tube to stop said case frame from moving past said distal end.

5. A side mirror assembly as set forth in claim 4 wherein said case frame includes a stop edge for abutting said stop thereagainst to positively engage said stop when said case frame and said mirror housing are moved to said distal end of said tube.

6. A side mirror assembly as set forth in claim 5 wherein said case frame extends around said tube.

7. A side mirror assembly as set forth in claim 6 wherein said tube defines an outer periphery.

8. A side mirror assembly as set forth in claim 7 wherein said case frame defines an inner periphery bigger than said outer periphery of said tube.

9. A side mirror assembly as set forth in claim 8 wherein said case frame includes a lever pin about which said locking lever pivots.

10. A side mirror assembly as set forth in claim 9 including a pivot bolt about which said tube pivots with respect to said base.

11. A side mirror assembly as set forth in claim 10 wherein said pivot end of said tube includes a pivot plug sealing said pivot end.

12. A side mirror assembly as set forth in claim 11 wherein a frustum is formed in said tube coaxial with said pivot bolt.

13. A side mirror assembly as set forth in claim 12 including a friction cone matingly engagable with said frustum to create a friction force to inhibit pivoting movement of said tube until the friction force is overcome by an applied force.

14. A side mirror assembly as set forth in claim 13 including a Belleville washer for forcing said friction cone into said frustum.

15. A side mirror as set forth in claim 14 wherein said mirror housing includes a lever recess to receive said locking lever when said locking lever is in said lock position.

16. A side mirror assembly for a motor vehicle, said side mirror assembly comprising:
    a base fixedly secured to the motor vehicle;
    a tube pivotally secured to said base, said tube extending between a pivot end and a distal end;
    a mirror housing defining a mirror opening and a tube opening, said mirror housing receiving said distal end and a portion of said tube disposed adjacent said distal end through said tube opening;
    a mirror mounted within said mirror housing and exposed through said mirror opening for an operator of the motor vehicle to view rearward of the motor vehicle without turning completely around;
    a case frame fixedly secured to said mirror housing at a position disposed adjacent said mirror;
    a locking lever movable between an unlock position allowing said case frame and mirror housing to slide along said tube; and a lock position for securing said case frame and said mirror housing at a desired position along said tube; and
    a lever recess to receive said locking lever when said locking lever is in said lock position.

17. A side mirror assembly as set forth in claim 16 wherein said locking lever includes a cam locking surface for engaging said tube to prevent said case frame and said mirror housing from moving along said tube.

18. A side mirror assembly as set forth in claim 17 wherein said locking lever is pivotally secured to said case frame.

19. A side mirror assembly as set forth in claim 18 including a stop fixedly secured to said distal end of said tube to stop said ease from moving past said distal end.

20. A side mirror assembly as set forth in claim 19 wherein said case frame includes a stop edge for abutting said stop thereagainst to positively engage said stop when said ease frame and said mirror housing are moved to said distal end of said tube.

21. A side mirror assembly for a motor vehicle, said side mirror assembly comprising:
    a base fixedly secured to the motor vehicle;
    a tube pivotally secured to said base, said tube defining an outer periphery and extending between a pivot end and a distal end;
    a mirror housing defining a mirror opening and a tube opening, said mirror housing receiving said distal end and a portion of said tube disposed adjacent said distal end through said tube opening;
    a mirror mounted within said mirror housing and exposed through said mirror opening for an operator of the motor vehicle to view rearward of the motor vehicle without turning completely around;
    a case frame fixedly secured to said mirror housing at a position disposed adjacent said mirror, said case frame extending around said tube and defining an inner periphery larger than said outer periphery of said tube; and
    a locking lever pivotally secured to said case frame and movable between an unlock position allowing said case frame and mirror housing to slide along said tube and a lock position for securing said case frame and said mirror housing at a desired position along said tube, said locking lever includes a cam locking surface for engaging said tube to prevent said case frame and said mirror housing from moving along said tube.

22. A side mirror assembly as set forth in claim 21 including a pivot bolt about which said tube pivots with respect to said base.

23. A side mirror assembly as set forth in claim 22 wherein said pivot end of said tube includes a pivot plug sealing said pivot end.

24. A side mirror assembly as set forth in claim 23 wherein a frustum is formed in said tube coaxial with said pivot bolt.

25. A side mirror assembly as set forth in claim 24 including a friction cone matingly engagable with said frustum to create a friction force to inhibit pivoting movement of said tube until the friction force is overcome by an applied force.

26. A side mirror assembly as set forth in claim 25 including a Belleville washer for forcing said friction cone into said frustum.

27. A side mirror as set forth in claim 26 wherein said mirror housing includes a lever recess to receive said locking lever when said locking lever is in said lock position.

* * * * *